United States Patent
Guntzburger et al.

(10) Patent No.: US 6,240,177 B1
(45) Date of Patent: May 29, 2001

(54) COMMUNICATION DEVICE COMPRISING AN OFF-HOOK DETECTION CIRCUIT

(75) Inventors: Philippe Guntzburger, Dachstein; Jean-Yves Moraillon, Wolxheim, both of (FR)

(73) Assignee: Thomson multimedia S.A., Boulogne Cedex (FR)

(*) Notice: Subject to any disclaimer, the term of this patent is extended or adjusted under 35 U.S.C. 154(b) by 0 days.

(21) Appl. No.: 08/750,264
(22) PCT Filed: Apr. 9, 1996
(86) PCT No.: PCT/FR96/00531
  § 371 Date: Feb. 23, 1998
  § 102(e) Date: Feb. 23, 1998
(87) PCT Pub. No.: WO96/32799
  PCT Pub. Date: Oct. 17, 1996

(30) Foreign Application Priority Data
Apr. 13, 1995 (FR) .................................. 95 04478

(51) Int. Cl.[7] .................................. H04M 1/00
(52) U.S. Cl. .................................. 379/387; 379/32; 379/38; 379/393
(58) Field of Search .................................. 379/381, 32, 38, 379/387, 393

(56) References Cited

U.S. PATENT DOCUMENTS

| | | | |
|---|---|---|---|
| 4,686,697 | * 8/1987 | Shapiro et al. | 379/38 |
| 4,998,271 | * 3/1991 | Tortola et al. | 379/32 |
| 5,521,974 | * 5/1996 | Hayashi et al. | 379/381 |
| 5,592,529 | * 1/1997 | Linsker | 379/32 |

FOREIGN PATENT DOCUMENTS 0613286   8/1994   (EP).

OTHER PUBLICATIONS

*Patent Abstracts of Japan, vol. 19, No. 635, & JP 07–023129 Ricoh Co. Ltd.

* cited by examiner

Primary Examiner—Wing F. Chan
(74) Attorney, Agent, or Firm—J. S. Tripoli; F. A. Wein

(57) ABSTRACT

The subject of the invention is a communications device connected in parallel with at least one item of communications apparatus on a transmission line (L1, L2). The device and the apparatus conform to a given template in terms of DC components. The device in accordance with the invention is characterized in that it comprises means (18, R1, R2, R3, D5, DZ) setting the operating point (X) in terms of DC component of the said device alone outside regions of the said template where the DC component of the current may be zero, means (R2, D6, D7, R4, 19, 20) of determining the DC component of the current flowing in the said device, means (20) of detecting a variation in the said DC current component. The invention applies particularly in the field of communication via the switched telephone network.

17 Claims, 4 Drawing Sheets

COMMUNICATION DEVICE COMPRISING AN OFF-HOOK DETECTION CIRCUIT

FIELD OF THE INVENTION

The subject of the invention is a communications device including detection of the unhooking of telephone instruments, modems or communications apparatus linked to the same telephone line. The invention applies particularly to automatic detection of the use of a telephone instrument by a data transmission modem.

BACKGROUND OF THE INVENTION

There is increasing use of apparatus of a type in which a switched telephone network (hereinafter "STN") is connected in parallel with a conventional telephone instrument. Such items of apparatus commonly employ a modem connected to the STN line to modulate or demodulate the data to be sent or to be received. However, apparatus now exists, such as certain digital television decoders, which uses a modem to establish a connection back to the program provider. In such digital television decoders, it is common practice to establish the connection back to the service provider at night time so as to avoid any inconvenience to the user.

The viewer therefore risks finding the telephone line busy when he picks up the handset. This can be inconvenient and even dangerous when an urgent call has to be made.

SUMMARY OF THE INVENTION

The subject of the invention is a communications device connected in parallel with at least one item of communications apparatus on a transmission line, the said device and the said apparatus conforming to a given template in terms of DC components, the said device being characterized in that it comprises:
means setting the operating point of the said device alone, in terms of DC component, outside regions of the said template where the DC component of the current may be zero,
means of determining the DC component of the current flowing in the said device,
means of detecting a variation in the said DC current component.

Given that the behaviour, in terms of DC components, of the other apparatus connected to the transmission line cannot be controlled, the operating point of the device in accordance with the invention is chosen appropriately in order to be able to obtain a detectable variation in the DC component of the current in the said device when one of the items of apparatus comes into operation.

By choosing the operating point of the device (when it is operating alone) outside of regions of the template where certain items of apparatus may (but do not necessarily) have a zero or low DC current component, a variation of the current in the said device is ensured.

According to one particular embodiment, the said means of setting the operating point comprise means of generating a characteristic, in terms of DC components, such that it possesses intersections with the possible load characteristics of the transmission line which are situated in regions of the said template where the DC current component cannot be zero.

The intersection between the load characteristic of the line and the characteristic of the device gives the operating point sought.

According to one particular embodiment, the said characteristic in terms of DC components comprises a point of intersection with the 1400 ohm load characteristic, the said point being situated beyond 8.6 V.

According to one particular embodiment, with the said template including a maximum current limit, the characteristic of the said device includes a maximum slope in the region bounded by the load characteristics and the said maximum limit, the said characteristic having a point which is common with each possible load characteristic.

The characteristic of the device extends throughout the possible operating region defined by the different load characteristics, the maximum slope maximizing the variation in current introduced, for example, upon unhooking a telephone instrument connected to the same line.

According to one particular embodiment, the said means of detecting a variation in the said DC component comprise a circuit forming the derivative of the signal corresponding to the said defined DC component.

According to one particular embodiment, the said means of detecting a variation in the said DC component comprise means of comparing the said defined DC component and the DC component at the operating point of the said device alone.

According to one particular embodiment, the said device comprises a bridge rectifying the voltage of the line interposed between the transmission line and an audio signal processing circuit.

According to one particular embodiment, with the positive output of the rectifier bridge being connected to the collectors of a first and second transistor mounted as an amplifier, the said positive output being linked to the base of the first transistor through a first resistor, the said amplifier feeds into a second resistor linked to the neutral output of the said rectifier bridge.

According to one particular embodiment, the said device further comprises a capacitor linking the base of the first transistor to the neutral output of the rectifier bridge.

According to one particular embodiment, the said device further comprises, in series between the input of the amplifier and the neutral output of the rectifier bridge, a third resistor, an on/off means and a first reference voltage generator, the said on/off means being closed when the line voltage exceeds a given value.

According to one particular embodiment, the said on/off means and the said voltage source comprise a Zener diode.

According to one particular embodiment, the said means of determining the DC component measure the voltage at the terminals of the second resistor.

According to one particular embodiment, the said means for determining the DC component tap off some of the current at the output of the amplifier towards a current-measuring circuit.

According to one particular embodiment, the current-tapping branch comprises, in series, a second reference voltage generator and a fourth resistor.

According to one particular embodiment, the said detection means carry out a comparison between the value of the DC component measured by the said current measuring circuit and the value of the DC component at the operating point of the said device.

According to one particular embodiment, the said comparison is carried out with respect to a range around the value of the DC component at the operating point of the said device.

According to one particular embodiment, the said determination circuit comprises a microprocessor connected to a digital-analog converter and to a memory in which is stored the value of the DC component at the operating point, the said digital-analog converter being linked to the terminals of a resistor connected to the tapping-off branch via an optocoupler.

The invention employs a detector circuit placed in parallel on the signal path. Thus a voltage drop possibly caused by a detector in series is avoided.

BRIEF DESCRIPTION OF THE DRAWING

Other characteristics and advantages of the invention will emerge through the description of a particular non-limiting embodiment illustrated by the figures, among which.

DETAILED DESCRIPTION

Figure 1A:
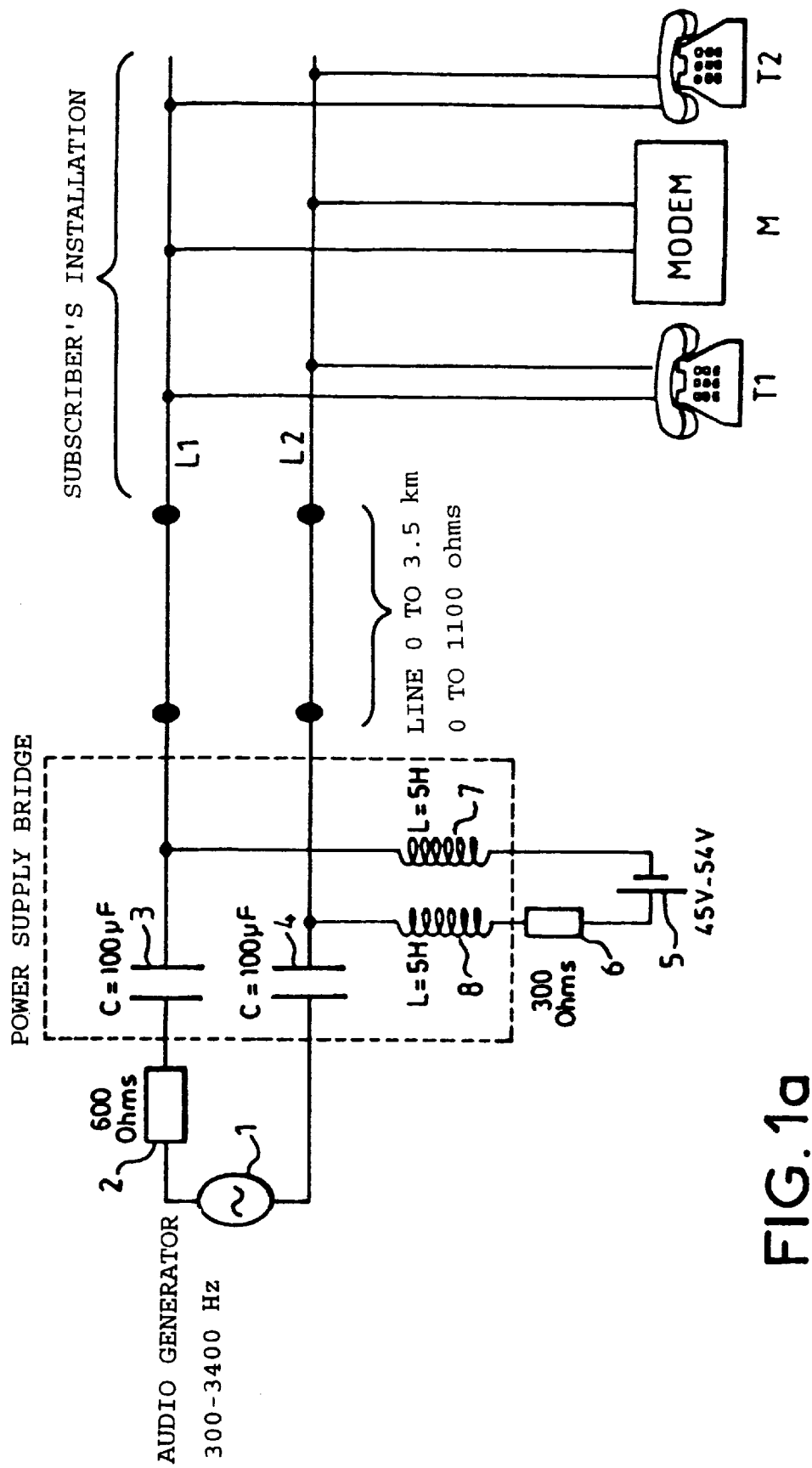
FIG. 1a is an electrical diagram of a telephone line.

According to the present embodiment, a digital television decoder is equipped with a modem and connected to the subscriber's STN network, to which in addition a certain number of other instruments are connected, whether they are modems, conventional telephone instruments or other apparatus. First of all, before taking the line, the television decoder checks that the line is not busy. Secondly, during data transmission, the television decoder monitors the line in order to detect a handset being lifted. If the handset is lifted, the transmission of the data is interrupted and the line freed. Both detections can be carried out by virtue of the device in accordance with the invention. FIG. 1a illustrates, in a simplified way, the composition of a telephone line of the STN network. The installation includes an audio signal generator 1 with passband from 300 to 3400 Hz. The internal resistance of the generator is symbolized by a 600 ohm resistor 2 placed in series with the generator.

The resistor 2 and the generator 1 are linked to the subscriber's two-wire transmission line (L1, L2) through two DC decoupling capacitors 3 and 4. The power supply bridge itself is placed in parallel on the two conductors: it comprises a voltage generator 5 in series with an internal resistor 6, and is linked to lines L1 and L2 via an inductor 7 and an inductor 8 respectively. The line itself is from 0 to 3.5 kilometres long. Having regard to the linear resistance of the conductors, this is equivalent to a resistor lying between 0 and 1100 ohms. The various items of subscriber apparatus (telephones T1 and T2, modem and decoder M according to the present example), are connected in parallel on the two conductors.

Figure 1B:
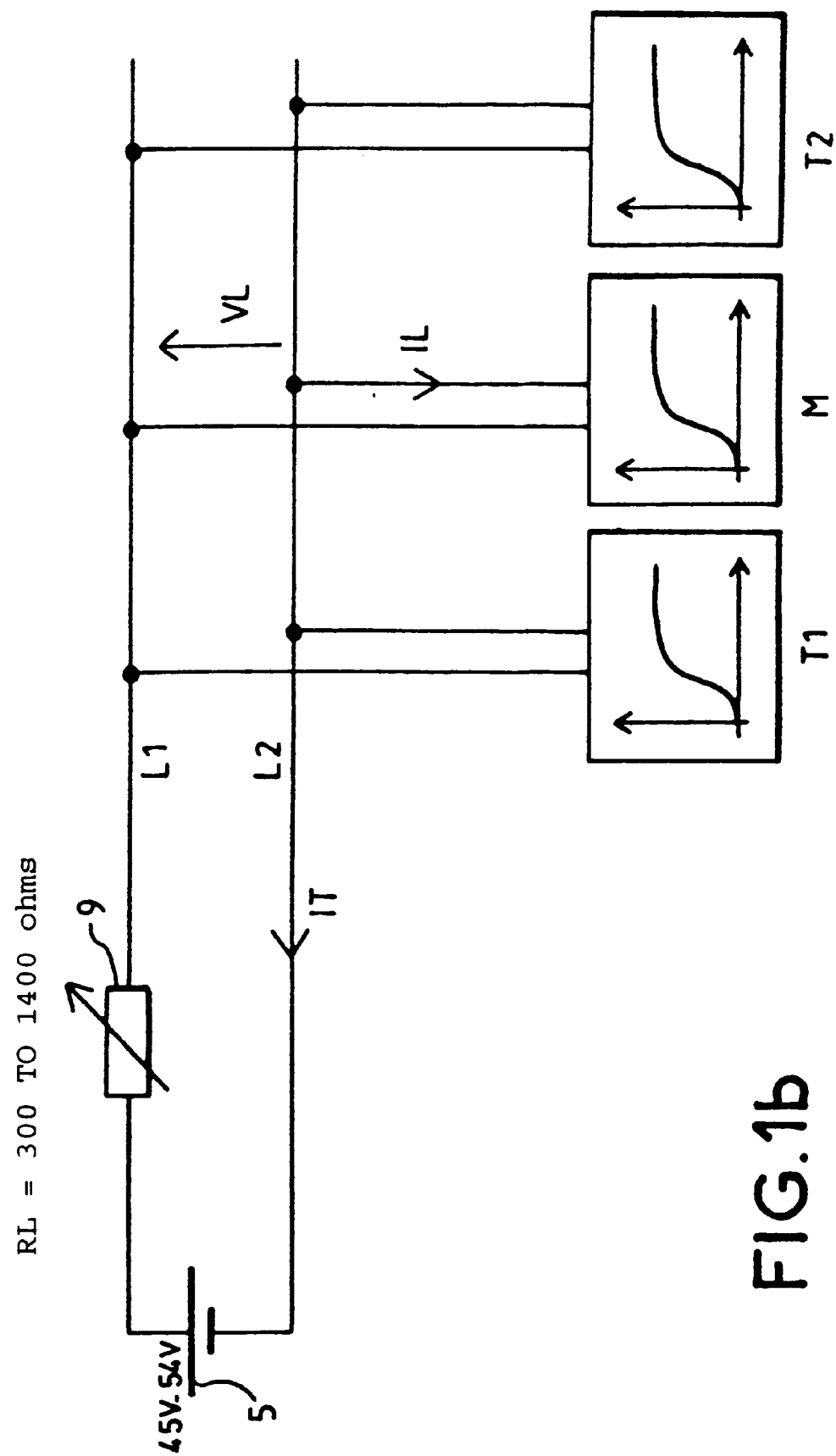
FIG. 1b is the equivalent of the diagram of FIG. 1a in terms of DC component.

FIG. 1b is the equivalent diagram in terms of DC component. The voltage generator is again present, in series with a variable resistor 9 of 300 to 1400 ohms, which incorporates the internal resistance of the generator as well as the resistance of the transmission line. Between the two conductors L1 and L2, a line voltage VL is generated. This voltage is, obviously, identical for all the apparatus connected to the conductors. The current flowing in the transmission line is referenced IT, while the current flowing in the modem M is referenced IL.

Figure 2:
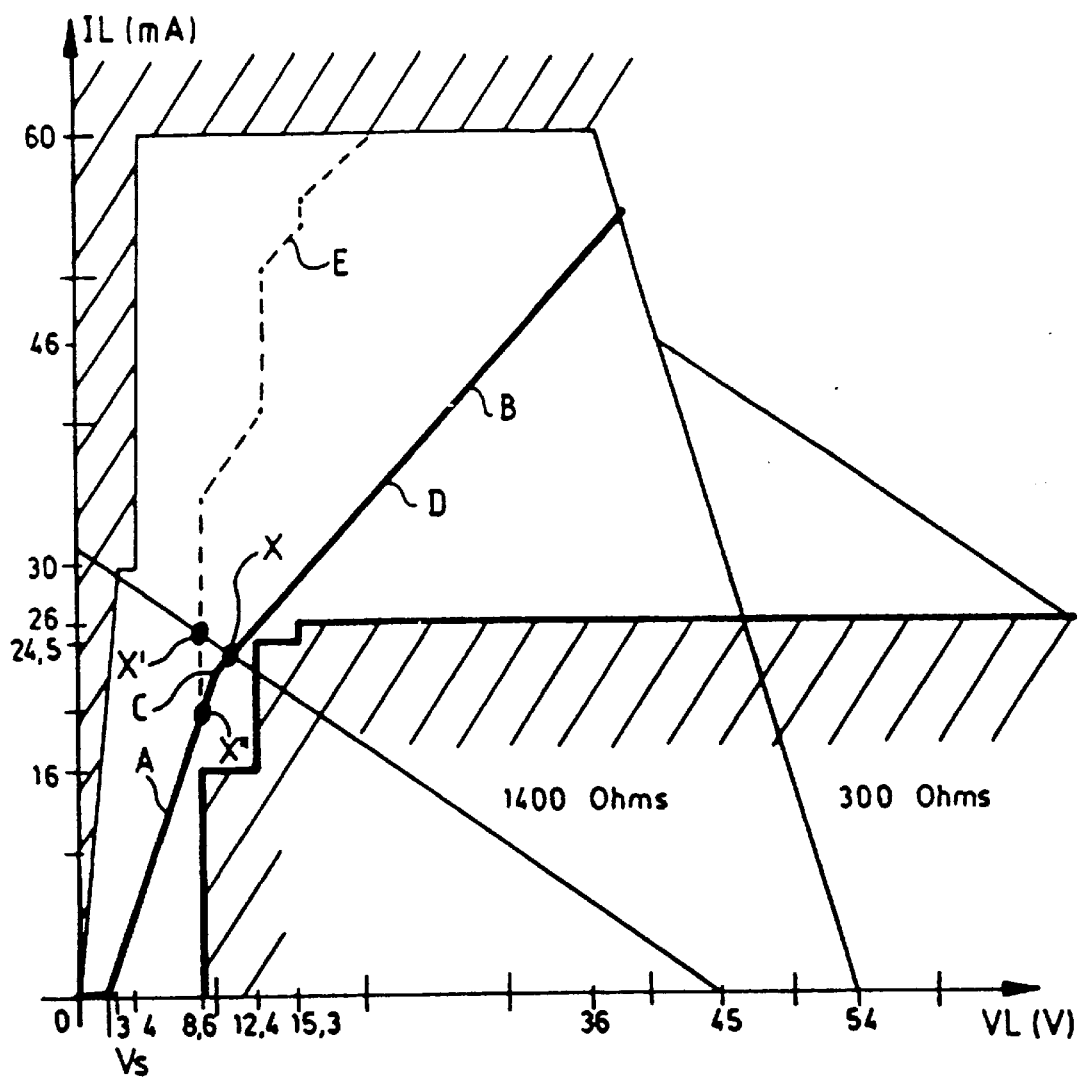
FIG. 2 is a graph of the template of the characteristics of an instrument, in terms of DC component of voltage and current, as well as the operating characteristic of a device in accordance with the present embodiment.

FIG. 2 illustrates the specified template of the DC characteristics of apparatus connected to the STN network in France. The voltage, in volts, is given on the abscissa, while the current strength is given in milliamps on the ordinate. The shaded parts correspond to the unauthorized operating points. Table 1 gives the coordinates (abscissa-ordinate pairs) of the two lines bounding the authorized operating region. This region is limited, moreover, by the two load lines labelled 300 ohms and 1400 ohms respectively.

TABLE 1

| Upper limit | Lower limit |
|---|---|
| (0; 0) | (0; 0) |
| (3; 30) | (8.6; 0) |
| (4; 30) | (8.6; 16) |
| (4; 60) | (12.4; 16) |
| (>4; 60) | (12.4; 12.5) |
|  | (15.3; 24.5) |
|  | (15.3; 26) |
|  | (>15.3; 26) |

The detection of an item of apparatus is carried out by monitoring the strength of the DC component of the current flowing in the modem. It is therefore sought to obtain a variation in current strength which is easily detectable when another item of apparatus connected to the transmission line is unhooked. Given that nothing can be done to this other apparatus, it is the operating characteristic of the detector apparatus, in this instance the modem, which is chosen appropriately.

In the context of the present example, it is the characteristic formed by the lower limit of the template of FIG. 2 which will be used as a characteristic of a telephone, the unhooking of which it is sought to detect. In fact, this characteristic exhibits a region of zero current strength between 0 and 8.6 V.

The curve D, in bold, of FIG. 2 represents the DC voltage and current characteristic of the device in accordance with the present example, while the dashed curve E represents the sum of the characteristic D and the characteristic of the telephone.

Let us suppose that the operating point of the modem alone is situated at point X, the intersection between the 1400 ohm load line and the characteristic of the modem. The 1400 ohm load line is taken here as an example because it is the example which takes account of the worst conditions. The same reasoning applies for any other load line. When the telephone is unhooked, the operating point of the telephone-modem combination will remain on the same load line, moving to point X'. From the point of view of the modem, the operating point will become X", situated on the characteristic of the modem and in the vertical from X', given that the voltage is the same at the terminals of the modem and of the telephone.

Let us take the case in which X lies within the zero current strength range of the characteristic of the telephone (this is not possible with the characteristics of the modem illustrated). In the event that the telephone is taken off the hook, X, X' and X" are coincident since the characteristic of the modem and the characteristic of the modem-telephone combination are coincident. No detection is then possible, since no variation in current or in voltage is felt at the modem.

It is necessary therefore for the operating point X to be situated outside of the zero current strength range, that is to say beyond 8.6 V in the present example.

The template limits the DC component of current to 60 mA, which implies a bend in the characteristic of the modem. In order to maximize the current variations introduced by unhooking the telephone, a slight bend is chosen, and thus a slope such that the characteristic of the modem rejoins the 300 ohm load line at about 60 mA of current strength. Given that it is the variation in current between the operating point of the modem before unhooking the telephone and the operating point of the modem after unhooking the telephone which is detected, a steep slope of the characteristic accentuates the variation in direct current within the modem.

Figure 3:
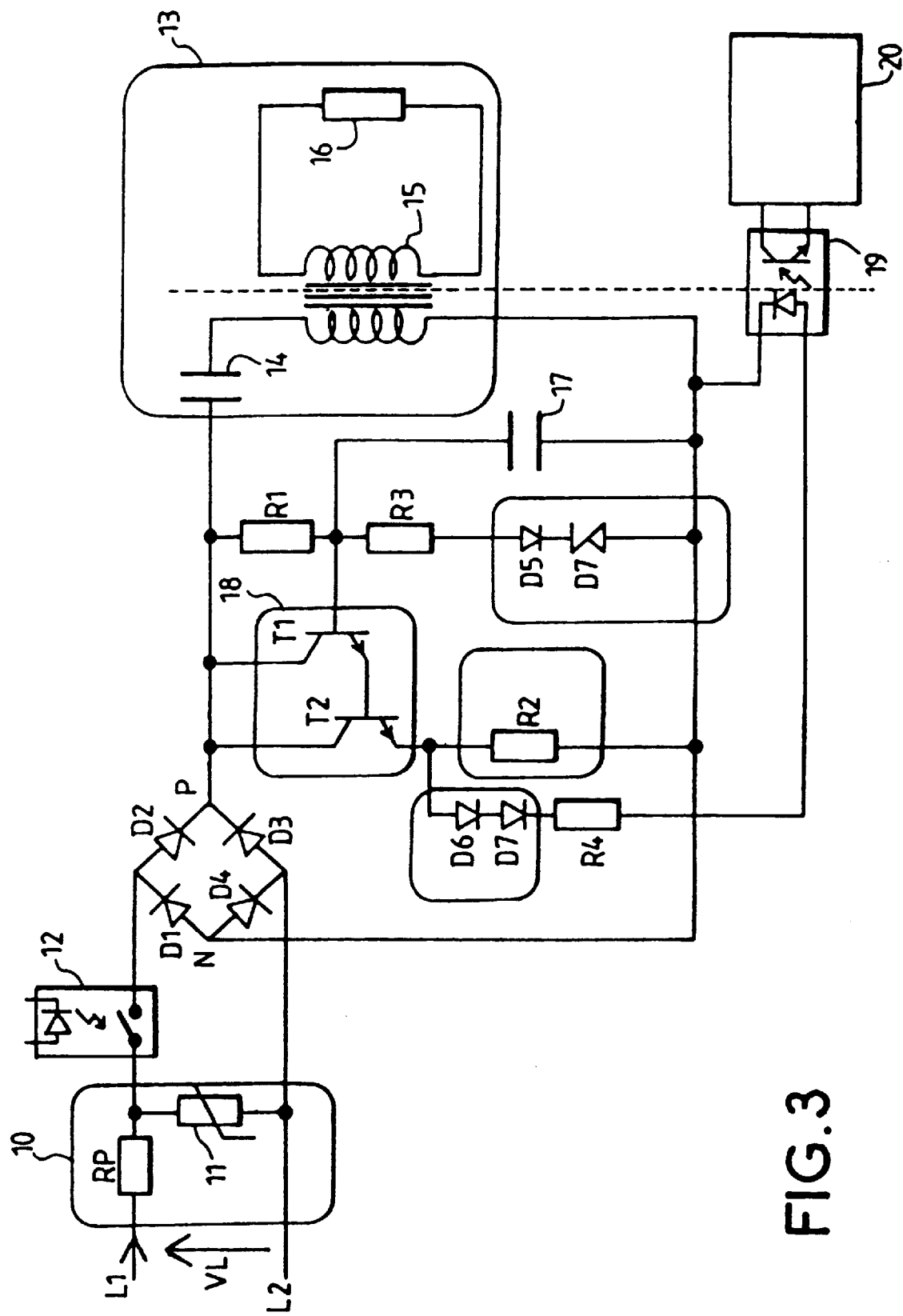
FIG. 3 is an electrical diagram of the device according to the present embodiment.

FIG. 3 is an electrical diagram of the device in accordance with the present embodiment. The device includes a circuit 10 for protection against surges, consisting of a resistor RP in series with one of the conductors L1 or L2, as well as a resistor 11 varying as a function of the applied voltage and placed in parallel on the two conductors, after RP. It will be remembered that the input voltage of the device is VL.

A MOS relay with a resistance of RO in the closed state is placed in series with RP, after the resistor 11. The two conductors feed a rectifier bridge consisting of four diodes D1 to D4. The output of the MOS relay 12 is connected between the diodes D1 and D2, the conductor L2 being connected between the diodes D3 and D4. The connections between the diodes D2 and D3, and D1 and D4 respectively, represent the "positive" P and the "neutral" N outputs of the rectifier.

The outputs of the rectifier bridge are connected to an audio processing circuit 13. This circuit 13 includes a capacitor 14 for decoupling the DC component, linked in series between the point P and the primary of a transformer. The primary is also linked to the point N. The load on the secondary of the transformer is represented by a load impedance 16.

The collectors of two transistors T1 and T2 mounted as a Darlington pair (18) are also connected to the point P. The base of transistor T1 is linked to the midpoint of a resistor bridge formed by a resistor R1 connected to the point P and a resistor R3 connected to the point N via a diode D5 in series with a Zener diode DZ. The Darlington pair may be replaced by another type of amplifier with sufficient gain.

The output of the Darlington pair, in this instance the emitter of transistor T2, is linked to the point N on the one hand via a resistor R2, and on the other hand via two diodes D6 and D7, a resistor R4 and the emitter diode of an optocoupler 19 in series. The midpoint of the resistor bridge R1 and R3 is also connected to the point N via a capacitor 17. The role of this capacitor is to filter the frequencies corresponding to the audio signals, in such a way as to avoid this signal disturbing the current in R2.

One function of the device is to create a DC characteristic meeting the criteria defined above. According to the present example, the characteristic is composed substantially of two straight line segments A and B which join together at a bend C.

Two reference voltages are used by the circuit. The first one, Vref1, is determined by the diode D5 and the Zener diode. Vref1 is chosen to lie at about 8.6 V with respect to the voltage reference of VL. The diode D5 has a temperature-dependent behaviour similar to that of the Darlington pair and increases the invariability of the temperature-dependent characteristics of the circuit. The second reference, Vref2, is determined by the two diodes D6 and D7. It is employed to detect the unhooking.

At first, the situation is that the voltage of 8.6 V is not reached by VL: the diode D5 and the Zener diode do not conduct. In this case, it can be shown that the slope A of the characteristic is substantially equal to Rp+R0+R2, the influence of R1 being made negligible by the high gain of the Darlington pair. Taking Rp=10 ohm, R0=30 ohm and R2=270 ohm a slope A is obtained of $1/310$ ohm$^{-1}$. The slope A can thus easily be adjusted by altering the resistor R2.

Two diodes of the rectifier bridge, as well as the two emitter-base junctions of T1 and T2 introduce an offset voltage Vs in the circuit. This voltage explains why the straight-line segment of the slope A does not start from the origin of the graph of FIG. 2, but is slightly offset. If each diode and each junction is considered to represent a voltage of 0.6 V, then Vs is substantially equal to 2.4 V.

When VL exceeds 8.6 V, D5 and the Zener diode conduct. In this case it can be shown that the slope of the segment B is given approximately by the relation: R2×(R1+R3)/R3. Taking the numerical values of R1=12 kohm and R3=2.7 kohm, a slope of $1/1470$ ohm$^{-1}$ is obtained.

The current in the emitter of T2 is substantially equal in absolute value to the direct current in RP. The voltage at the terminals of the resistor R2 gives an adequate image of this current. The diodes D6 and D7 and the resistor R4 tap off a part of this current to the optocoupler 19. The reference voltage created by D6 and D7, as well as the value of R4 (2.7 kohm according to the present example) calibrate the current passing through the diode of the optocoupler 19. The phototransistor of this optocoupler is linked to a circuit 20 for determining the value of the DC component of the current. The value thus obtained is compared to a range of values situated around the operating point X of FIG. 2. When the measured value of the current lies outside of this region, it is detected that there is an instrument in operation connected to the telephone line.

The value of the current strength at the operating point X is stored in a memory of the circuit 20. The latter also comprises a microprocessor as well as an analog-digital converter carrying out the conversion of the information supplied by the optocoupler into data which can be interpreted by the microprocessor. According to the present embodiment, a variation of the order of magnitude of a few mA around this value determines the abovementioned range.

According to one particular embodiment, the said value of the strength of the current at the operating point is reprogrammed automatically by the circuit 20 from time to time, for example upon each successful line acquisition. This variant makes it possible to take account of the ageing of certain components, particularly the optocoupler.

The detection circuit is employed on various occasions:

In the first place, when the apparatus including the modem has to take the line, the modem is set in operation for a brief time, the time to stabilize the current within the circuit and to determine the value of the DC component of the current. In this way, it is possible to check whether the line is busy.

Secondly, the determination of the DC component is carried out periodically when a data transmission is in progress. If it is detected that another apparatus is in operation during this transmission, the transmission is interrupted to give priority to the detected apparatus. The transmission is resumed after a waiting period.

The periodicity of the determination of the DC component is intended to avoid excessive use of the microprocessor of the circuit 20, which can be used for other tasks.

According to a variant embodiment, the circuit 20 comprises a circuit for tapping off the current supplied by the optocoupler. A variation in the current then triggers the stopping of a data transmission by causing an interrupt within a microprocessor controlling the modem. In this case, the device is only used for detection of the unhooking of another apparatus during a communication.

It should be noted that the closer the characteristic of the modem is to the template, the more insensitive it needs to be to temperature variations. According to one particular embodiment, in order to avoid going outside the template, a safety distance is provided between the limits of the template and the characteristic of the modem.

The embodiment described relates to an apparatus including a modem and transmitting modulated data via the STN network. It is quite obvious that the invention is not limited to this example, any apparatus linked to the STN network or to a network having similar properties may be modified by the person skilled in the art in order to implement the invention.

According to the example given, the operating point, in DC terms, of the modem is chosen to lie within a region of the template where the DC component of the current cannot be zero, this being done to avoid non-detection of an apparatus effectively exhibiting a zero DC component. According to a variant embodiment, those regions of the template are also avoided where the DC component of the current of apparatus other than the modem may be low enough not to induce a current variation detectable by the modem.

The template in terms of DC components of FIG. 2 is the template valid in France. Nevertheles , the invention is not limited to this particular template.

What is claimed is:

1. Communications device connected in parallel with at least one item of communications apparatus on a transmission line, the said device and the said apparatus conforming to a given template in terms of DC components, the said device being characterized in that it comprises:
   means setting the operating point of the said device alone, in terms of DC component, outside regions of the said template where the DC component of the current may be zero,
   means of determining the DC component of the current flowing in the said device,
   means of detecting a variation in the said DC current component.

2. Communications device connected in parallel with at least one item of communications apparatus on a transmission line, the said device and the said apparatus conforming to a given template in terms of DC components, the said device being characterized in that it comprises:
   means setting the operating point of the said device alone. in terms of DC component, outside regions of the said template where the DC component of the current may be zero;
   means of determining the DC component of the current flowingq in the said device;
   means of detecting a variation in the said DC current component; and wherein:
      the said means of setting the operating point comprise means of generating a characteristic, in terms of DC components, such that it possesses intersections with the possible load characteristics of the transmission line which are situated in regions of the said template where the DC current component cannot be zero.

3. Device according to claim 2, characterized in that said characteristic in terms of DC components comprises a point of intersection with the 1400 Ohm load characteristic, the said point being situated beyond 8.6 V.

4. Device according to claim 2 characterized in that, with the said template including a maximum current limit, the characteristic of the said device includes a maximum slope in the region bounded by the load characteristics and the said maximum limit, the said characteristic having a point which is common with each possible load characteristic.

5. Device according to claim 1 characterized in that the said means of detecting a variation in the said DC component comprise a circuit forming the derivative of the signal corresponding to the said defined DC component.

6. Device according to claim 1, characterized in that the said means of detecting a variation in the said DC component comprises means of comparing the said defined DC component and the DC component at the operating point of the said device alone.

7. Device according to claim 1, characterized in that it comprises a bridge rectifying the voltage of the line interposed between the transmission line and an audio signal processing circuit.

8. Communications device connected in parallel with at least one item of communications apparatus on a transmission line. the said device and the said apparatus conforming to a given template in terms of DC components, the said device being characterized in that it comprises:
   means setting the operating point of the said device alone, in terms of DC component, outside regions of the said template where the DC component of the current may be zero;
   means of determining the DC component of the current flowing in the said device;
   means of detecting a variation in the said DC current component;
   a bridge rectifying the voltage of the line interposed between the transmission line and an audio signal processing circuit; and wherein:
      the positive output of the rectifier bridge being connected to the collectors of a first and second transistor mounted as an amplifier, the said positive output being linked to the base of the first transistor through a first resistor, the said amplifier feeds into a second resistor linked to the neutral output of the said rectifier bridge.

9. Device according to claim 6, characterized in that it further comprises a capacitor linking the base of the first transistor to the neutral output of the rectifier bridge.

10. Device according to claim 8, characterized in that it further comprises, in series between the input of the amplifier and the neutral output of the rectifier bridge, a third resistor, and on/off means and a first reference voltage generator, the said on/off means being closed when the line voltage exceeds a given value.

11. Device according to claim 10, characterized in that the said on/off means and the said voltage source comprises a Zener diode.

12. Device according to claim 8, characterized in that the said means of determining the DC component measure the voltage at the terminal s of the second resistor.

13. Device according to claim 8, characterized in that the said means for determining the DC component tap off some of the current at the output of the amplifier towards a current-measuring circuit.

14. Device according to claim 13, characterized in that the current-tapping branch comprises, in series, a second reference voltage generator and a fourth resistor.

15. Device according to claim 13, characterized in that the said detection means carry out a comparison between the value of the DC component measured by the said current measuring circuit and the value of the DC component at the operating point of the said device.

17. Device according to claim 16, characterized in that the said means of determining the DC component of the current flowing in the said device comprises a microprocessor connected to a digital-analog converter and to a memory in which is stored the value of the DC component at the operating point, the said digital-analog converter being linked to the terminals of a resistor connected to the tapping-off branch via an optocoupler.

16. Device according to claim 15, characterized in that the said comparison is carried output with respect to a range around the value of the DC component at the operating point of the said device.

* * * * *